United States Patent
Baek et al.

(10) Patent No.: US 12,444,430 B2
(45) Date of Patent: Oct. 14, 2025

(54) ELECTRONIC DEVICE FOR CONTROLLING BEAMFORMING AND OPERATING METHOD THEREOF

(71) Applicant: Samsung Electronics Co., Ltd., Suwon-si (KR)

(72) Inventors: Soonho Baek, Suwon-si (KR); Sangeun Kim, Suwon-si (KR); Seonmi Kim, Suwon-si (KR); Hangil Moon, Suwon-si (KR); Kyoungho Bang, Suwon-si (KR); Seunghun O, Suwon-si (KR); Gunwoo Lee, Suwon-si (KR); Junwoo Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 18/181,167

(22) Filed: Mar. 9, 2023

(65) Prior Publication Data
US 2023/0215453 A1    Jul. 6, 2023

Related U.S. Application Data

(63) Continuation of application No. PCT/KR2022/017507, filed on Nov. 9, 2022.

(30) Foreign Application Priority Data

Nov. 9, 2021 (KR) .......................... 10-2021-0152849
Dec. 24, 2021 (KR) .......................... 10-2021-0187676

(51) Int. Cl.
G10L 21/0232 (2013.01)
G10L 21/0216 (2013.01)
(Continued)

(52) U.S. Cl.
CPC .......... G10L 21/0232 (2013.01); G10L 25/84 (2013.01); H04R 1/1075 (2013.01);
(Continued)

(58) Field of Classification Search
CPC . G10L 21/0232; G10L 21/0216; G10L 25/84; G10L 25/18; G10L 25/30;
(Continued)

(56) References Cited

U.S. PATENT DOCUMENTS 8,515,089 B2  8/2013  Nicholson
8,774,952 B2  7/2014  Kim et al.
(Continued)

FOREIGN PATENT DOCUMENTS

CN   112530453 A    3/2021
EP   3 745 399 A1  12/2020
(Continued)

OTHER PUBLICATIONS

European Search Report dated Dec. 23, 2024, issued in European Application No. 22893169.7.

*Primary Examiner* — Yogeshkumar Patel
(74) *Attorney, Agent, or Firm* — Jefferson IP Law, LLP

(57) ABSTRACT

An electronic device is provided. The electronic device includes, for the purpose of determining a customized beamformer filter, an input module including a plurality of microphones configured to receive an external sound signal, a memory configured to store computer-executable instructions and an initial value of a voice parameter used to perform beamforming on the external sound signal, and a processor configured to execute the instructions by accessing the memory. The instructions may be configured to estimate a feature value of the external sound signal, calculate the initial value of the voice parameter used to perform beamforming based on the external sound signal received by (Continued)

the plurality of microphones, determine whether to store the calculated initial value according to the feature value, determine which one of the calculated initial value or an initial value stored in the memory used according to the feature value, and obtain a target voice parameter.

18 Claims, 10 Drawing Sheets

(51) Int. Cl.
*G10L 25/84* (2013.01)
*H04R 1/10* (2006.01)
*H04R 1/40* (2006.01)
*H04R 3/00* (2006.01)

(52) U.S. Cl.
CPC .............. *H04R 1/406* (2013.01); *H04R 3/005* (2013.01); *G10L 2021/02166* (2013.01)

(58) Field of Classification Search
CPC ................. G10L 25/78; G10L 21/0356; G10L 2021/02166; G10L 2021/02165; H04R 1/1075; H04R 1/1016; H04R 1/406; H04R 3/005; H04R 25/40; H04R 25/405; H04R 25/407; H04R 25/505; H04R 2201/107; H04R 2225/025; H04R 2225/43; H04R 2430/23; H04R 2430/20
See application file for complete search history.

(56) References Cited

U.S. PATENT DOCUMENTS

| | | | |
|---|---|---|---|
| 9,313,572 | B2 | 4/2016 | Dusan et al. |
| 10,818,313 | B2 | 10/2020 | Wang |
| 2009/0089053 | A1 | 4/2009 | Wang et al. |
| 2009/0304200 | A1 | 12/2009 | Kim et al. |
| 2011/0299695 | A1 | 12/2011 | Nicholson |
| 2013/0128701 | A1 | 5/2013 | Derkx |
| 2014/0093093 | A1 | 4/2014 | Dusan et al. |
| 2019/0279657 | A1 | 9/2019 | Wang |
| 2021/0044896 | A1* | 2/2021 | Kim ........................ H03F 3/183 |
| 2021/0168518 | A1 | 6/2021 | Jensen et al. |
| 2021/0174819 | A1* | 6/2021 | Baek ................... G10L 21/0232 |
| 2021/0176558 | A1 | 6/2021 | Li et al. |
| 2021/0249030 | A1* | 8/2021 | Lee ..................... G10L 21/0232 |
| 2021/0297789 | A1* | 9/2021 | De Haan ............ G10L 21/0216 |

FOREIGN PATENT DOCUMENTS

| | | |
|---|---|---|
| JP | 2010-085733 A | 4/2010 |
| KR | 10-1982812 B1 | 5/2019 |
| KR | 10-2020-0066366 A | 6/2020 |

\* cited by examiner

__(1)__

ELECTRONIC DEVICE FOR CONTROLLING BEAMFORMING AND OPERATING METHOD THEREOF

CROSS-REFERENCE TO RELATED APPLICATION(S)

This application is a continuation application, claiming priority under § 365(c), of an International application No. PCT/KR2022/017507, filed on Nov. 9, 2022, which is based on and claims the benefit of a Korean patent application number 10-2021-0152849, filed on Nov. 9, 2021, in the Korean Intellectual Property Office, and of a Korean patent application number 10-2021-0187676, filed on Dec. 24, 2021, in the Korean Intellectual Property Office, the disclosure of each of which is incorporated by reference herein in its entirety.

BACKGROUND

1. Field

The disclosure relates to an electronic device for controlling beamforming and a method for controlling the same.

2. Description of Related Art

The electronic device may provide a function related to audio signal processing. For example, the electronic device may provide a call function for collecting and transmitting audio signals and a recording function for recording audio signals.

Electronic devices that output audio, such as earphones and headphones, may be equipped with various technologies for removing and suppressing noise to distinguish a voice signal. For example, headphones may obtain ambient noise through a microphone connected to a noise canceling circuit, and may output an anti-noise signal having an antiphase relative to the obtained noise. The ambient noise and the antiphase noise may be heard together, which for the user may have the effect of removing the noise. In addition, research is being conducted on a method of performing beamforming on signals received through a plurality of microphones to obtain a more improved user voice from an audio output device.

The above information is presented as background information only to assist with an understanding of the disclosure. No determination has been made, and no assertion is made, as to whether any of the above might be applicable as prior art with regard to the disclosure.

SUMMARY

Electronic devices, such as earphones or headphones to be used while being worn on ears, have limited form factors. When such an electronic device is worn by a user, because a microphone mounted on the electronic device is at a distance from the user's mouth, the influence of ambient noise may be significant, and a user's voice may not be readily obtained.

When an electronic device such as earphones or headphones is performing a function such as a call or recording in an environment with a lot of ambient noise, a good voice signal may not be easily obtained.

Earphones or headphones through which a user's voice may not be obtained properly may degrade the quality of voice calls and make it difficult to recognize a voice.

Aspects of the disclosure are to address at least the above-mentioned problems and/or disadvantages and to provide at least the advantages described below. Accordingly, an aspect of the disclosure is to provide an electronic device for controlling beamforming and operating method.

Additional aspects will be set forth in part in the description which follows and, in part, will be apparent from the description, or may be learned by practice of the presented embodiments.

In accordance with an aspect of the disclosure, an electronic device is provided. The electronic device includes an input module including a plurality of microphones configured to receive an external sound signal. The electronic device includes a memory configured to store computer-executable instructions and an initial value of a voice parameter used to perform beamforming on the external sound signal. The electronic device may include a processor configured to execute the instructions by accessing the memory. The instructions may be configured to estimate a feature value of the external sound signal. The instructions may be configured to calculate the initial value of the voice parameter used to perform beamforming based on the external sound signal received by the plurality of microphones. The instructions may be configured to determine whether to store the calculated initial value in the memory according to the feature value. The instructions may be configured to determine which one of the calculated initial value or the initial value stored in the memory is to be used according to the feature value. The instructions may be configured to obtain a target voice parameter used to perform beamforming on the external sound signal based on the determined initial value according to the feature value.

In accordance with another aspect of the disclosure, a method of obtaining a voice parameter used to perform beamforming is provided. The method includes estimating a feature value of an external sound signal received by a plurality of microphones. The method may include calculating an initial value of a voice parameter used to perform beamforming on the external sound signal. The method may include determining whether to store the calculated initial value according to the feature value. The method may include determining which one of the calculated initial value or a stored initial value is to be used according to the feature value. The method may include obtaining a target voice parameter used to perform beamforming on the external sound signal based on the determined initial value according to the feature value.

In accordance with another aspect of the disclosure, an operating method of an electronic device is provided. The operating method includes estimating a feature value of an external sound signal received by a plurality of microphones. The operating method includes calculating an initial value of a voice parameter used to perform beamforming on the external sound signal. The operating method includes determining whether to store the calculated initial value according to the feature value. The operating method includes determining which one of the calculated initial value or a stored initial value is to be used according to the feature value. The operating method includes obtaining a target voice parameter used to perform beamforming on the external sound signal based on the determined initial value according to the feature value. The operating method may include determining a filter used to perform beamforming on the external sound signal based on the target voice parameter. The operating method includes estimating a magnitude of residual noise with respect to a signal on which beamforming is performed using the filter. The operating method includes performing noise processing on the signal on which beamforming is performed according to the estimated magnitude of the residual noise.

According to one embodiment, an electronic device that may adjust a voice parameter used to perform beamforming according to a feature value of an external sound signal may be provided.

According to one embodiment, an electronic device that may adaptively determine a beamformer filter according to different user wearing styles and ear shapes may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
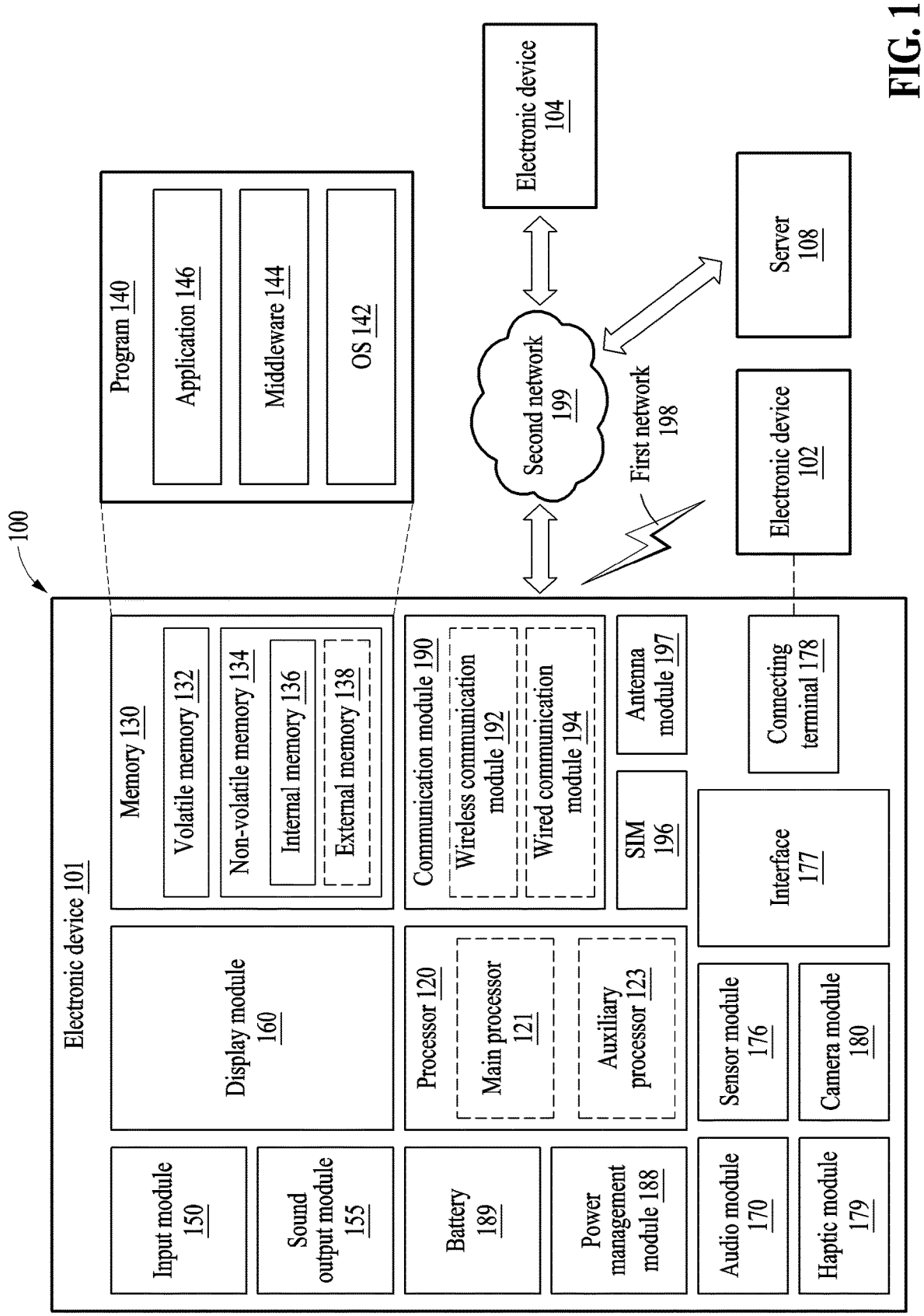
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive, from the outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside the electronic device 101. The sound output module 155 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more of external electronic devices receiving the request may perform the at least part of the function or service, or an additional function or an additional service related to the request, and may transfer an outcome of the performing to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
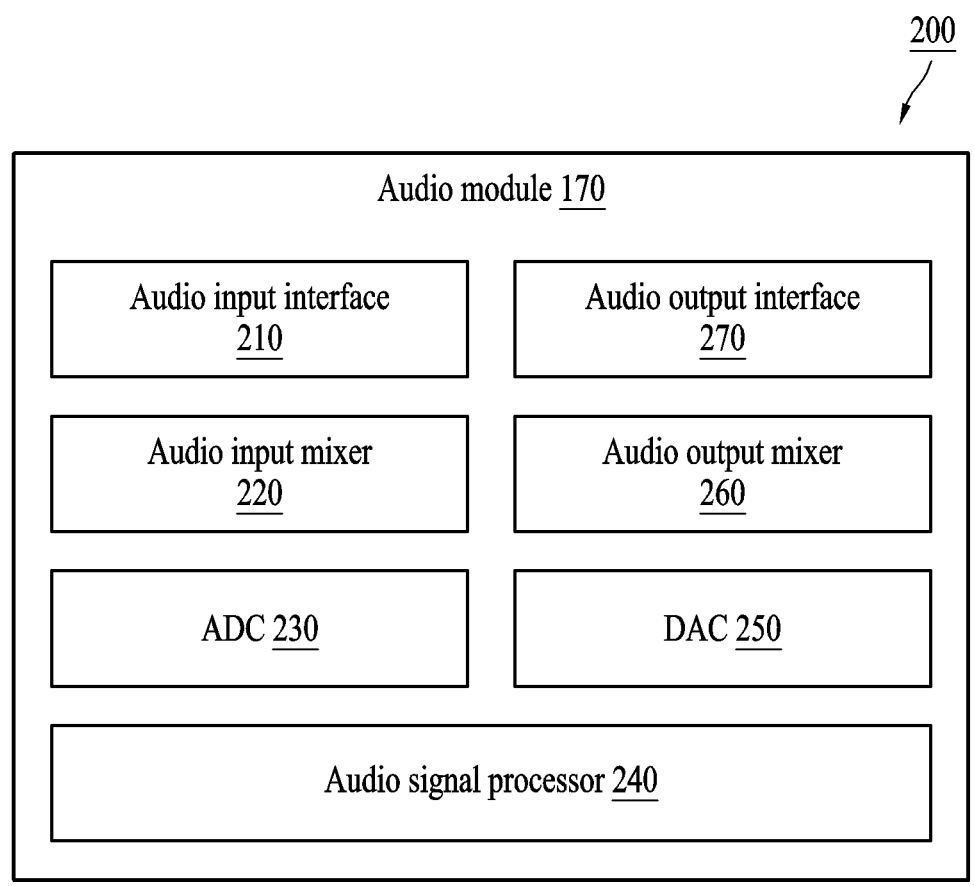
FIG. 2 is a block diagram of an audio module according to an embodiment of the disclosure.

FIG. 2 is a block diagram of an audio module according to an embodiment of the disclosure.

Referring to FIG. 2 depicting a block diagram 200, an audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an example embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an example embodiment, additionally or alternatively, the audio input interface 210 may receive an audio signal from another component (e.g., the processor 120 or the memory 130) of the electronic device 101.

The audio input mixer 220 may synthesize a plurality of input audio signals into at least one audio signal. For example, according to an example embodiment, the audio input mixer 220 may synthesize a plurality of analog audio signals input via the audio input interface 210 into at least one analog audio signal.

The ADC 230 may convert an analog audio signal into a digital audio signal. For example, according to an example embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an example embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an example embodiment, one or more functions of the audio signal processor 240 may be implemented in the form of an equalizer.

The DAC 250 may convert a digital audio signal into an analog audio signal. For example, according to an example embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be output, into at least one audio signal. For example, according to an example embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an example embodiment, the sound output module 155 may include a plurality of speakers. In such a case, the audio output interface 270 may output audio signals having a plurality of different channels (e.g., stereo channels or 5.1 channels) via at least some of the plurality of speakers. According to an example embodiment, the audio output interface 270 may be connected with the external electronic device 102 (e.g., an external speaker or a headset) directly via the connecting terminal 178 or wirelessly via the wireless communication module 192 to output an audio signal.

According to an example embodiment, the audio module 170 may generate, without separately including the audio input mixer 220 or the audio output mixer 260, at least one digital audio signal by synthesizing a plurality of digital audio signals using at least one function of the audio signal processor 240.

According to an example embodiment, the audio module 170 may include an audio amplifier (not shown) (e.g., a speaker amplifying circuit) that is capable of amplifying an analog audio signal input via the audio input interface 210 or an audio signal that is to be output via the audio output interface 270. According to an example embodiment, the audio amplifier may be configured as a module separate from the audio module 170.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one or two of A, B, or C," each of which may include any one of the items listed together in the corresponding one of the phrases, or all possible combinations thereof. Terms such as "1st" and "2nd," or "first" and "second" may be used to simply distinguish a corresponding component from other components, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., by wire), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more of instructions may include a code generated by a compiler or a code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more of functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
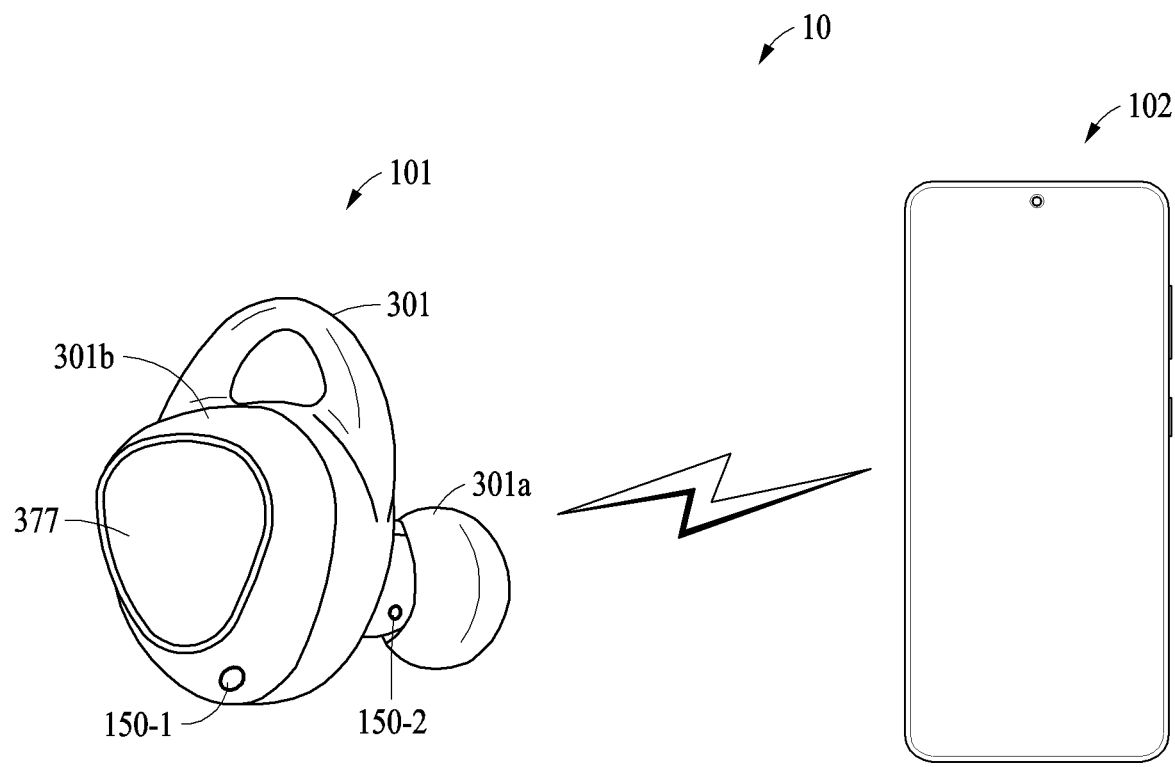
FIG. 3 is a diagram illustrating an example of an audio signal processing system according to an embodiment of the disclosure.

FIG. 3 is a diagram illustrating an example audio signal processing system according to an embodiment of the disclosure.

Referring to FIG. 3, according to an example embodiment, an audio signal processing system 10 may include a first electronic device 101 and a second electronic device 102. The first electronic device 101 and the second electronic device 102 may include at least a portion of a configuration of the electronic device 101 described above with reference to FIG. 1. According to an example embodiment, the first electronic device 101 may be connected to the second electronic device 102 by wire or wirelessly, and may output an audio signal transmitted by the second electronic device 102. The first electronic device 101 may collect an external sound signal using a plurality of microphones and transmit the collected audio signal to the second electronic device 102.

According to an example embodiment, the first electronic device 101 may be a wireless earphone capable of forming a short-range communication channel (e.g., a Bluetooth module-based communication channel) with the second electronic device 102. For example, the first electronic device 101 may be any one of a true-wireless stereo (TWS), a wireless headphone, and a wireless headset. The first electronic device 101 is illustrated as a kernel-type wireless earphone in FIG. 3, but is not limited thereto. For example, the first electronic device 101 may be a stem-type wireless earphone in which at least a portion of the housing protrudes in a predetermined direction to collect a good user voice signal. According to an example embodiment, the first electronic device 101 may be a wired earphone connected to the second electronic device 102 in a wired manner.

According to an example embodiment, the first electronic device 101, which is an earphone-type device, may include a housing 301 (or a case) including an insertion portion 301a that may be inserted into a user's ear, and a mounting portion 301b connected to the insertion portion 301a and capable of being mounted at least partially on the user's auricle. The first electronic device 101 may include a plurality of microphones 150-1 and 150-2.

According to various example embodiments, the electronic device 101 may include an input interface 377 capable of receiving an input of the user. The input interface 377 may include, for example, a physical interface (e.g., a physical button or a touch button) and a virtual interface (e.g., a gesture, object recognition, or voice recognition). In one embodiment, the electronic device 101 may include a touch sensor capable of detecting a contact with the user's skin. For example, an area (e.g., the input interface 377) in which the touch sensor is disposed may be located in a part of the electronic device 101. The user may apply an input by touching the area using a body part. The touch input may include, for example, a single touch, multiple touches, a swipe, and/or a flick.

The microphones 150-1 and 150-2 may perform the function of the input module 150 described above with reference to FIG. 1. Any repeated description related thereto has been omitted. Among the microphones 150-1 and 150-2, a first microphone 150-1 may be disposed on the mounting portion 301b such that, based on the inside of the ear, at least a portion of the sound hole may be exposed to the outside, to collect external ambient sound while the first electronic device 101 is worn on the user's ear. Among the microphones 150-1 and 150-2, a second microphone 150-2 may be disposed on the insertion portion 301a. The second microphone 150-2 may be disposed such that, based on the auricle-side opening of the outer ear path, at least a portion of the sound hole is exposed toward the inside of the outer ear path or at least a portion of the sound hole is in contact with the inner wall of the outer ear path, to collect signals transmitted into the outer ear canal (or, external auditory canal) while the first electronic device 101 is being worn on the user's ear. For example, when the user makes a voice utterance while wearing the first electronic device 101, at least some of the tremor from the utterance may be transmitted through the user's skin, muscles, or bones, and the transmitted tremor may be collected as ambient sound by the second microphone 150-2 inside the ear.

According to one embodiment, the second microphone 150-2 may be any of various types of microphones (e.g., an in-ear microphone, an inner microphone, or a bone conduction microphone) capable of collecting sound from the cavity inside the user's ear. For example, the second microphone 150-2 may include at least one air conduction microphone and/or at least one bone conduction microphone for detecting a voice. The air conduction microphone may detect a voice (e.g., an utterance of a user) transmitted through air and output a voice signal corresponding to the detected voice. The bone conduction microphone may measure a vibration of a bone (e.g., the skull) caused by a vocalization of a user and output a voice signal corresponding to the measured vibration. The bone conduction microphone may be referred to as a bone conduction sensor, or various other names. A voice detected by the air conduction microphone may be a voice mixed with external noise, the mixing occurring while the user's utterance is being transmitted through air. Since the voice detected by the bone conduction microphone is from the vibration of a bone, it may include less external noise (e.g., influence of noise).

In FIG. 3, the first microphone 150-1 and the second microphone 150-2 are respectively illustrated as being installed on the electronic device 101, one of each, but the number is not limited thereto. A plurality of the first microphone 150-1, which is an external microphone, and a plurality of the second microphone 150-2, which is an in-ear microphone, may be installed on the electronic device 101. Although omitted from FIG. 3, the electronic device 101 may further include an accelerator for voice activity detection (VAD) and a vibration sensor (e.g., a voice pickup unit (VPU) sensor).

According to one embodiment, the first electronic device 101 may include the audio module 170 described above with reference to FIGS. 1 and 2. Any repeated description related thereto has been omitted. The first electronic device 101 may perform audio signal processing such as noise processing (e.g., noise suppressing), frequency band adjustment, and gain adjustment through the audio module 170 (e.g., through the audio signal processor 240 of FIG. 2). The configuration of the first electronic device 101 will be described in detail with reference to FIG. 5B. The first electronic device 101 may be referred to as the electronic device 101 in the descriptions relating to FIGS. 4, 5A and 5B, and 6 to 11.

According to one embodiment, the electronic device 101 may include a sensor capable of detecting of the electronic device 101 is worn on the user's ear. For example, the sensor may include a sensor (e.g., an infrared sensor or a laser sensor) capable of detecting a distance to an object, and a sensor (e.g., a touch sensor) capable of detecting a contact with the object. As the electronic device 101 is worn on the user's ear, the sensor may generate a signal by detecting a distance to the skin or a contact with the skin. The processor 120 of the electronic device 101 may recognize whether the electronic device 101 is currently being worn by detecting the signal generated by the sensor.

According to an example embodiment, the second electronic device 102 may establish a communication channel with the first electronic device 101, transmit a designated audio signal to the first electronic device 101, or receive an audio signal from the first electronic device 101. For example, the second electronic device 102 may be any of various electronic devices such as a mobile terminal, a terminal device, a smartphone, a tablet personal computer (PC), a pad, or a wearable electronic device capable of forming a communication channel (e.g., a wired or wireless communication channel) with the first electronic device 101. The second electronic device 102 may include a configuration that is the same as or similar to the configuration of the electronic device 101 described above with reference to FIG. 1, and may include fewer or more configurations than the electronic device 101 of FIG. 1 depending on the implementation. The second electronic device 102 may be referred to as the electronic device 102 in the descriptions relating to FIGS. 4, 5A and 5B, and 6 to 11.

According to one embodiment, in the audio signal processing system 10, the first electronic device 101 may perform beamforming to obtain an improved user voice signal. For example, the first electronic device 101 may perform beamforming on external sound signals received through the plurality of microphones 150-1 and 150-2. A beamformer that performs beamforming according to one embodiment is described in detail with reference to FIG. 4.

Figure 4:
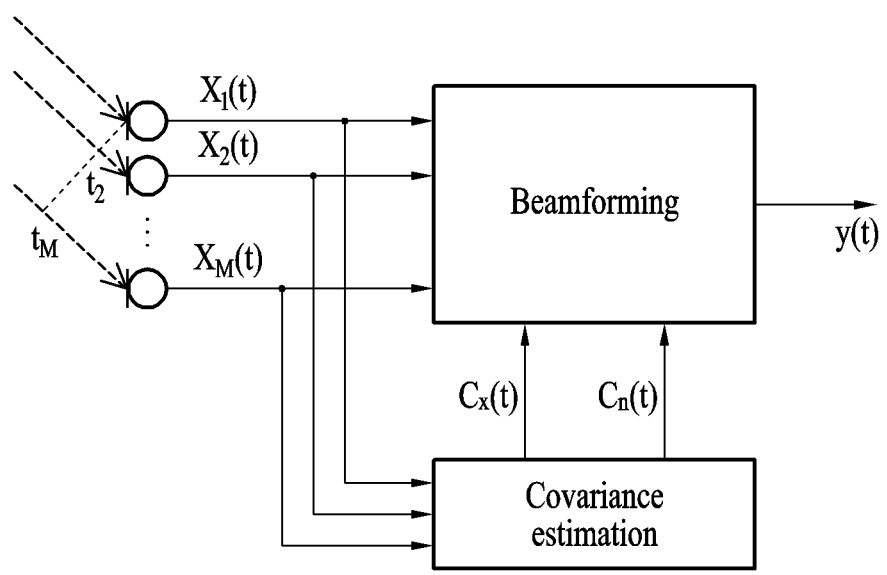
FIG. 4 is a block diagram illustrating a beamformer according to an embodiment of the disclosure.

FIG. 4 is a block diagram illustrating a beamformer according to an embodiment of the disclosure.

FIG. 4 is a block diagram illustrating a signal-dependent beamformer according to an embodiment of the disclosure. Types of beamforming and beamformers are briefly described with reference to FIG. 4.

Referring to FIG. 4, a signal $x_i(t)$ input to an i-th microphone of M microphones may include a voice signal $s_i(t)$ and a noise signal $n_i(t)$ and may be represented by $x_i(t)=s_i(t)+n_i(t)$. The signal $x_i(t)$, which is directional and has different phases for each of a plurality of microphones, may be input to the plurality of microphones, and a phase difference may be determined according to a position of a sound source. In general, since a position of a sound source of the voice signal and a position of a sound source of the noise signal are different, as shown in Equation 1, a phase difference $t_{s,i}$ between a voice signal input to a first microphone of M microphones and a voice signal input to the i-th microphone and a phase difference $t_{n,i}$ between a noise signal input to the first microphone and a noise signal input to the i-th microphone may be different.

$$x_i(t)=s_1(t-t_{s,i})+n_1(t-t_{n,i}) \qquad \text{Equation 1}$$

Beamforming is a technique for improving a feature value, such as a signal-to-noise ratio (SNR), of a voice signal by compensating for a phase difference with respect to an input signal input to each of different microphones. An output signal y(t) output through beamforming may be represented by Equation 2.

$$y(t) = \sum_{i}^{M} w_i(t) * x_i(t) \qquad \text{Equation 2}$$

$w_i(t)$ may be to compensate for a phase difference with respect to a voice signal and may be referred to as a beamformer vector, beamformer filter, and the like. A noise element may be canceled by $w_i(t)$, and a magnitude of the noise element may be reduced compared to that of a voice element, such that an SNR of the voice signal may be improved.

A beamformer may be classified as a signal-independent beamformer or a signal-dependent beamformer according to whether a feature of an input signal is used. A signal-independent beamformer may estimate a direction of arrival (DoA) of a voice through a localization technique and perform beamforming by compensating for a phase difference between a signal input to each microphone using direction information. According to how a beamformer filter $w_i(t)$, which compensates for a phase difference, is obtained, the signal-independent beamformer may include a delay-and-sum beamformer (DSBF), a generalized sidelobe canceller (GSC) beamformer, a minimum variance distortionless response (MVDR) beamformer, and the like. In an environment in which direction information of a voice signal and position information of a microphone may be obtained in advance or in an environment in which estimation may be performed with high accuracy (e.g., an environment in which a position of a user may not change), the signal-independent beamformer may maintain a predetermined performance level regardless of an SNR. However, in response to a change in the position of the user, a DoA of the user's mouth may need to be estimated. Accordingly, an error in estimating the DoA of the user's mouth in a noisy environment may occur, and reverberation may occur indoors, and thus performance of the signal-independent beamformer may be degraded.

The signal-dependent beamformer is a beamformer that performs beamforming based on spatial characteristics of microphone input signals. FIG. 4 is a block diagram illustrating a signal-dependent beamformer according to one embodiment. In a noisy environment, an input signal of a microphone may be divided into a section in which a voice and noise are mixed and a section in which only noise is present without a voice. Cx, which is a voice covariance matrix, may be obtained from the section in which a voice is included, and Cn, which is a noise covariance matrix, may be obtained from the section in which only noise is present. Cx may include a spatial characteristic of a voice, and Cn may include a spatial characteristic of noise. Examples of obtaining Cx and Cn are described with reference to FIG. 5A.

Based on Cx and Cn, a beamformer directed toward a user's mouth and a beamformer that generates a null vector toward the user's mouth may be determined. The signal-dependent beamformer may reduce a magnitude of noise in a voice signal based on the beamformer filter that steers toward the user's mouth or obtain only a noise element based on the beamformer that generates a null vector toward the user's mouth.

There may be various example embodiments that determine a beamformer filter based on the covariance matrices Cx and Cn. For example, a MaxSNR beamformer may determine a beamformer filter based on Equation 3 in a way that an SNR of a signal is improved as much as possible.

$$C_n(f)^{-1}C_x(f)W_{SNR}(f)=\lambda_{max,S}W_{SNR}(f) \quad \text{Equation 3}$$

The MaxSNR beamformer may determine $W_{SNR}(f)$, which is an eigen vector having a largest eigenvalue $\lambda_{max,S}$ of $C_n(f)^{-1}C_x(f)$, to be a beamformer filter.

As another example, an MVDR beamformer may perform beamforming to remove noise while minimizing a voice distortion. A beamformer filter may be obtained using the MVDR beamformer in various ways. For example, a beamformer filter may be obtained using the MaxSNR beamformer as shown in Equation 4.

$$W_{MVDR}(f) = \frac{W_{SNR}(f)}{W_{SNR}^H(f)C_n(f)W_{SNR}(f)} \frac{1}{(C_n(f)W_{SNR}(f))_1} \quad \text{Equation 4}$$

As another example, a blocking matrix (BM) $W_{BM,SNR}(f)$ of a GSC may be obtained using a null space of $W_{SNR}(f)$ obtained using the MaxSNR beamformer based on Equation 5.

$$W_{BM,SNR}(f) = I - \frac{C_n(f)W_{SNR}(f)W_{SNR}^H(f)}{W_{SNR}^H(f)C_n(f)W_{SNR}(f)} \quad \text{Equation 5}$$

Through $W_{BM,SNR}(f)$, a voice element may be removed from a signal in which noise and a voice are mixed, and the noise may be more accurately removed from the signal in which the noise and voice are mixed based on the signal in which the voice element is removed.

Unlike the signal-independent beamformer, the signal-dependent beamformer may have improved robustness to a voice direction. However, performance of the signal-dependent beamformer may be reduced as accuracy of a voice covariance matrix Cx is reduced in a low SNR environment. A position of a voice may be estimated using the signal-independent beamformer in response to a voice activity being detected based on an in-ear microphone or a vibration sensor. However, an error in estimating a position of a voice may increase in the low SNR environment. In addition, controlling beamforming based on a position of a voice may merely compensate for a deviation caused by a wearing angle and not reflect a deviation caused by a difference in a wearing style or a structure of the inner ear. An ideal beamforming direction may vary depending on a user's wearing style and inner ear structure, and a beamformer filter may also vary.

FIGS. 5A and 5B, and 6, 7, 8, 9, 10, and 11 illustrate, in detail, how to prevent performance degradation in a low SNR environment due to a difference in a user's wearing style and inner ear structure.

Figure 5A:
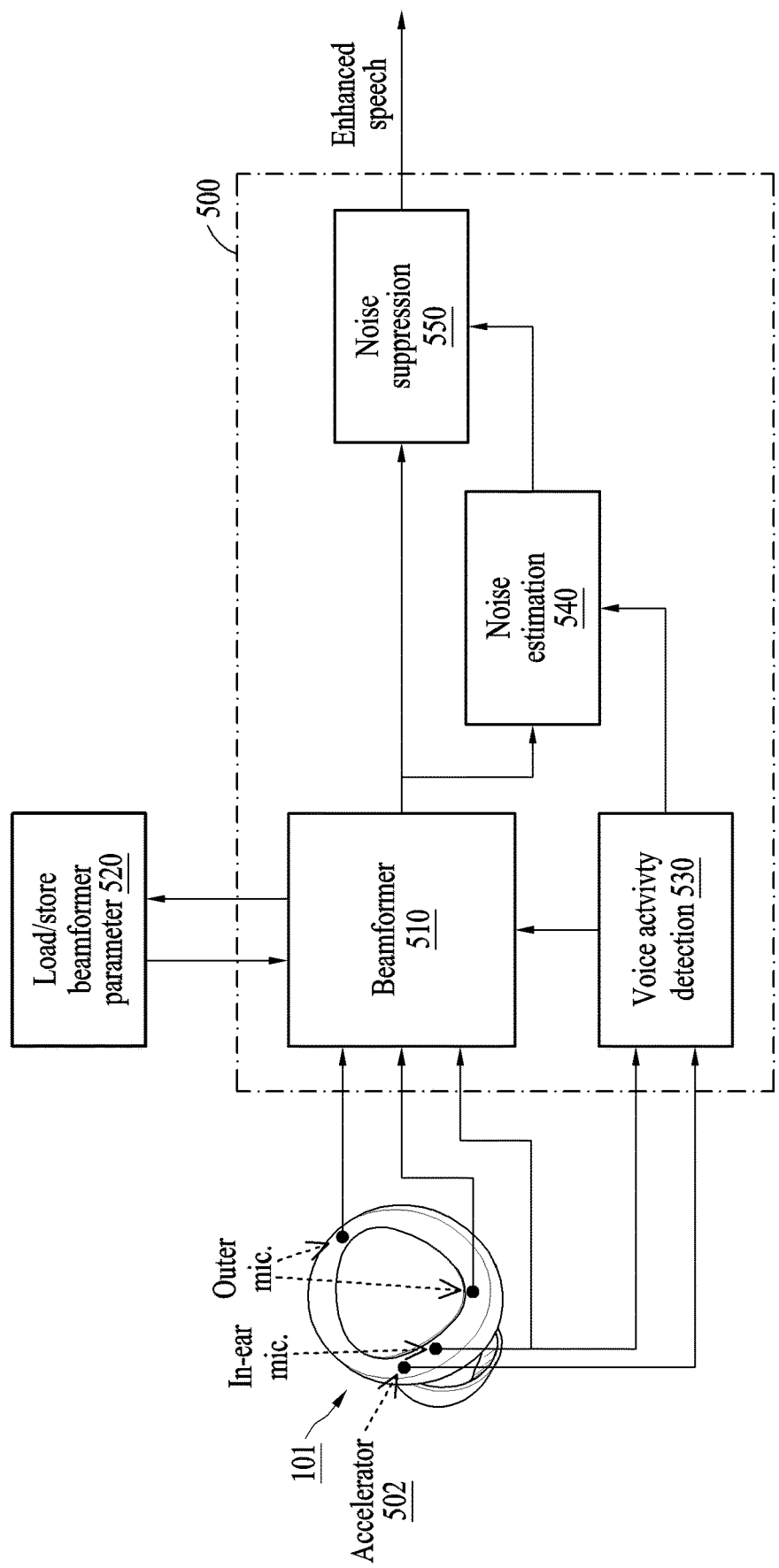
FIGS. 5A and 5B are diagrams illustrating a process of performing beamforming and noise processing in an electronic device and a configuration of the electronic device according to various embodiments of the disclosure.
Figure 5B:
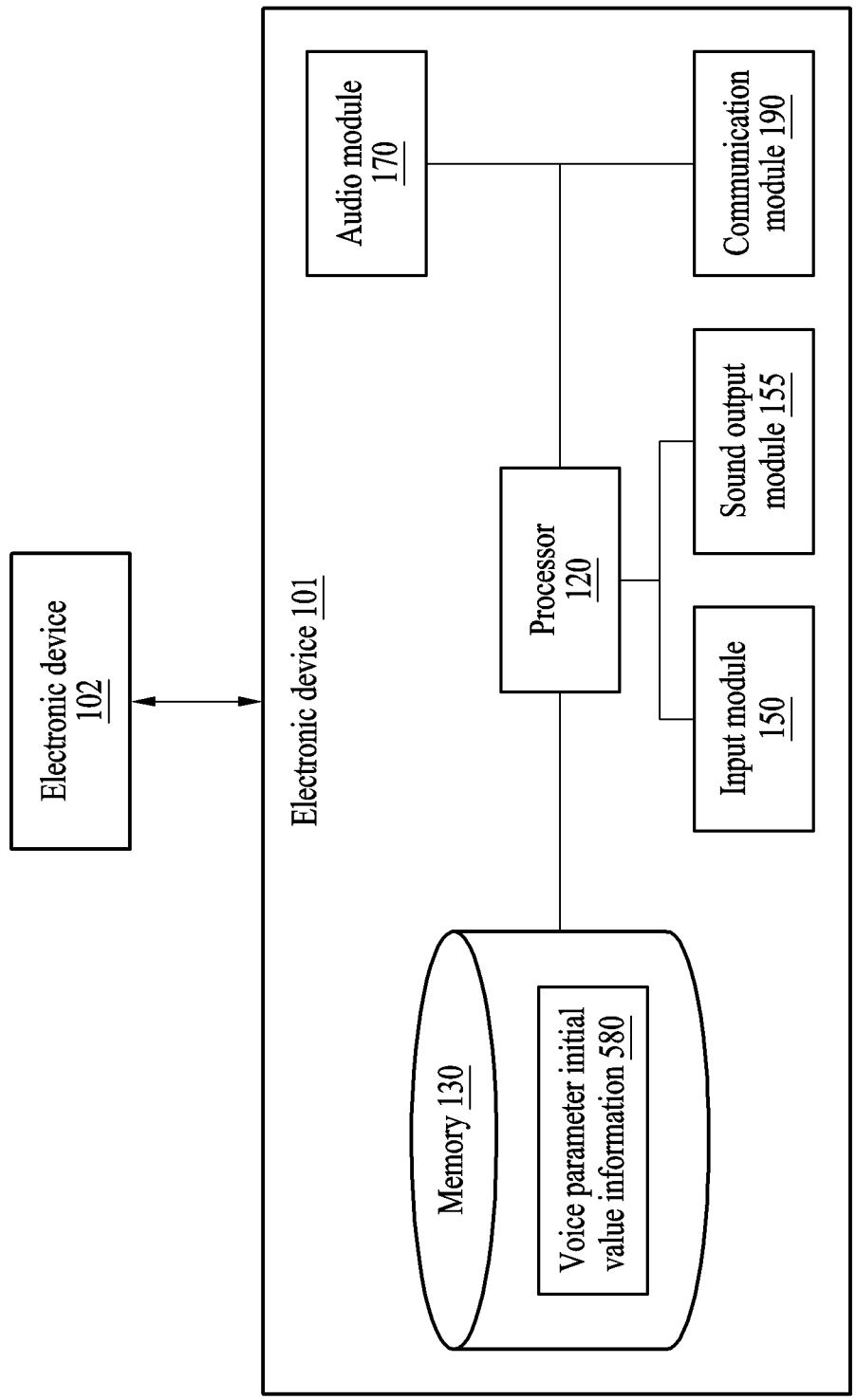

FIGS. 5A and 5B are diagrams illustrating a process of performing beamforming and noise processing in an electronic device and a configuration of an electronic device according to various embodiments of the disclosure.

FIG. 5A illustrates a noise processing system that performs beamforming and noise processing in an electronic device according to an embodiment of the disclosure.

Referring to FIG. 3, the electronic device 101 may include an external microphone (e.g., the first microphone 150-1 of FIG. 3), an in-ear microphone (e.g., the second microphone 150-2 of FIG. 3), and an accelerator 502.

A beamformer in operation 510 may perform beamforming on an external sound signal received by a plurality of microphones (e.g., an external microphone and in-ear microphone) of the electronic device 101. The electronic device 101 may determine a beamformer filter by loading, from a memory, a parameter (e.g., a voice covariance matrix Cx described with reference to FIG. 4) related to a determination of a beamformer filter or storing (e.g., operation 520 of loading or storing a beamformer parameter) the parameter in the memory according to a feature value of the external sound signal. An operation of performing beamforming according to a feature value of an external sound signal is described in detail with reference to FIGS. 6 to 11.

A voice activity may be detected (e.g., VAD 530) based on the in-ear microphone and the accelerator 502 of the electronic device 101. A mask m(t,f) corresponding to an f-th frequency bin in a t-th frame may be estimated based on voice activity detection (VAD), and a covariance matrix Cx(f) of a voice and a covariance matrix Cn(f) of noise may be determined based on Equation 6 below. However, the method of obtaining a Cx and a Cn is not limited to Equation 6, and various methods may be used.

$$C_x(f)=E\{m(t,f)X(t,f)X(t,f)^H\}$$

$$C_n(f)=E\{(1-m(t,f))X(t,f)X(t,f)^H\} \quad \text{Equation 6}$$

$X(t,f)=[X_1(t,f), X_2(t,f), \ldots, X_M(t,f)]^T$ may be a microphone input signal corresponding to the f-th frequency bin in the t-th frame. As described above with reference to FIG. 4, diagonal matrix elements of a Cx and a Cn may include information on a magnitude of each signal, and non-diagonal matrix elements may include information on a space of each signal. The Cx and Cn may be used to determine a filter of the beamformer 410 as described above with reference to FIG. 4.

In response to a beamformer filter being determined, a magnitude of residual noise may be estimated (e.g., at noise estimation 540) according to a result of VAD 530, and the residual noise may be removed (via noise suppression operation 550) from a beamforming result according to information on the estimated magnitude of the noise. A deep neural network (DNN) may be used in a process of removing residual noise.

By performing the above-mentioned series of operations of the noise processing system 500, the electronic device 101 may output an improved voice audio signal. Hereinafter, a configuration of the electronic device 101 is described with reference to FIG. 5B, and an operation of the electronic device 101 is described in detail with reference to FIGS. 6 to 11.

FIG. 5B is a block diagram illustrating a configuration of the electronic device 101 according to an embodiment of the disclosure.

The electronic device 101 of FIG. 5B may be the first electronic device 101 described above with reference to FIG. 3, and the electronic device 102 of FIG. 5B may be the second electronic device 102 described above with reference to FIG. 3.

The electronic device 101 may include an input module 150 for receiving an ambient sound, a sound output module 155 for outputting a sound in which the ambient sound is processed, an audio module 170 for processing the ambient sound, a memory 130 in which computer-executable instructions and voice parameter initial value information 580 are stored, and a processor 120 for executing the instructions by accessing the memory 130. The electronic device 101, the electronic device 102, the processor 120, the memory 130, the input module 150, the sound output module 155, the audio module 170, and the communication module 190 may correspond to the electronic device 101, the electronic device 102, the processor 120, the memory 130, the input module 150, the sound output module 155, the audio module 170, and the communication module 190 described above with reference to FIGS. 1 to 4, and any repeated description thereof has been omitted. As described above with reference to FIG. 3, the electronic device 101 may be an audio output device such as wireless earphones, and the electronic device 102 may be an electronic device such as a smartphone that transmits and receives an audio signal to and from the electronic device 101.

The processor 120 may estimate a feature value of an external sound signal received by the input module 150. For example, the processor 120 may estimate the feature value of the external sound signal received by a plurality of microphones (e.g., the external microphone (e.g., first microphone 150-1) of FIG. 3 and the in-ear microphone 150-2). Hereinafter, a feature value is described based on an SNR, but examples are not limited thereto, and noise power of an external sound signal may be used as a feature value, for example.

The processor 120 may calculate an initial value of a voice parameter used to perform beamforming based on the external sound signal, determine whether to store the calculated initial value in the voice parameter initial value information 580 of the memory 130 according to the feature value, determine which one of the calculated initial value or a stored initial value is to be used, and obtain a voice parameter based on the determined initial value. The voice parameter may be a voice covariance matrix Cx used to determine a beamformer filter related to the signal-dependent beamformer described above with reference to FIG. 4.

According to one embodiment, a program (e.g., the program 140 of FIG. 1) that adjusts a beamformer filter according to a feature value of an external sound signal to obtain an improved voice signal may be stored as software in the memory 130. An operation of the processor 120 is described in detail with reference to FIGS. 6 to 11.

Figure 6:
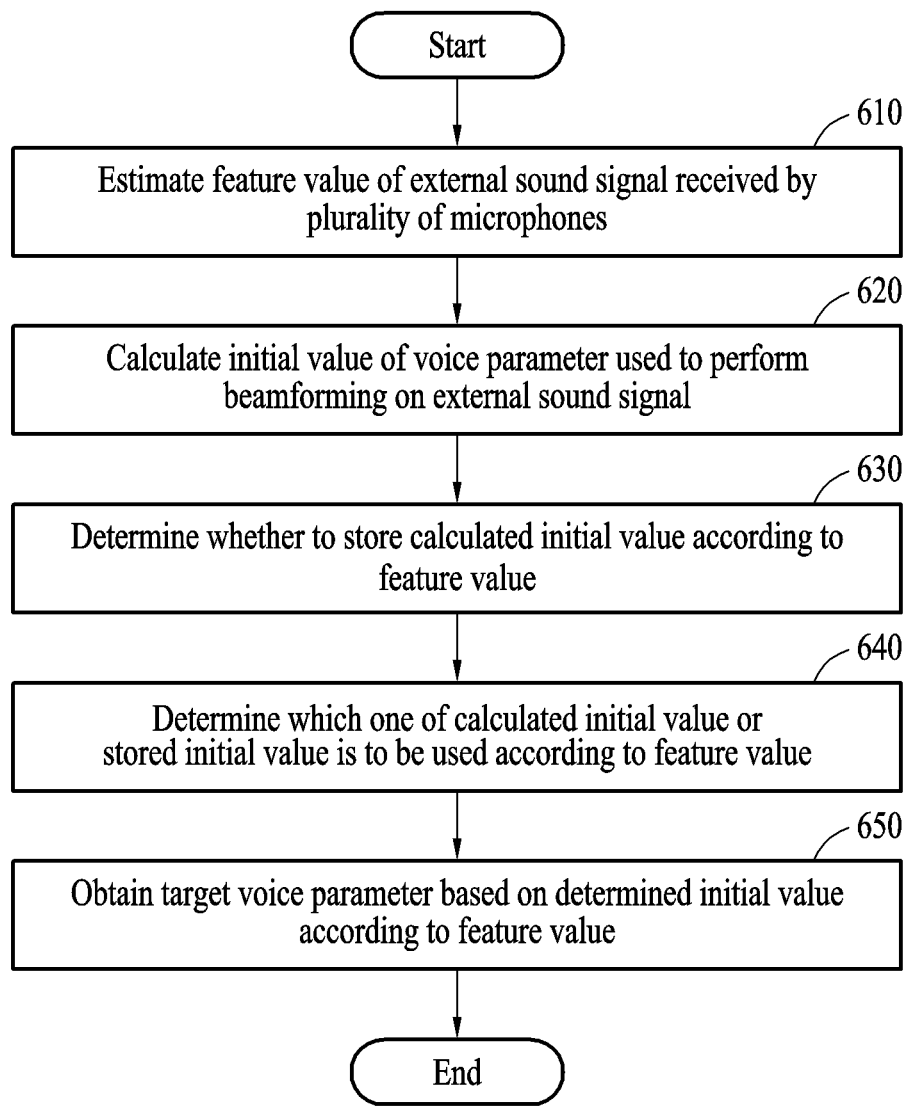
FIG. 6 is a flowchart illustrating an operating method of an electronic device according to an embodiment of the disclosure.

FIG. 6 is a flowchart illustrating an operating method of an electronic device according to an embodiment of the disclosure.

Operations 610 to 650 may be performed by the processor 120 of the electronic device 101 described above with reference to FIG. 5B. Thus, any description overlapping the description referring to FIGS. 1 to 4, and 5A and 5B will not be repeated for conciseness. Operations 610 to 650 may correspond to beamforming operation 510 or operation 520 of loading or storing a parameter related to a beamformer filter described above with reference to FIG. 5A.

Referring to FIG. 6, according to one embodiment, in operation 610, the processor 120 may estimate a feature value of an external sound signal. The external sound signal may be received by the input module 150, for example, the plurality of microphones 150-1 and 150-2 of FIG. 3, described above with reference to FIG. 5B.

According to one embodiment, the processor 120 may estimate a feature value of an external sound signal received by a main microphone (e.g., a microphone closest to a mouth among the plurality of microphones) of the plurality of microphones mounted on the electronic device 101. A feature value may be an SNR or noise power. The processor 120 may estimate the feature value using the voice activity detection (VAD) 530 technique described above with reference to FIG. 5A. For example, as described above with reference to FIG. 5A, the processor 120 may estimate an SNR of an external sound signal more accurately by estimating an SNR when a voice activity is detected based on a vibration sensor, an accelerator, an in-ear microphone, and the like.

According to one embodiment, in operation 620, the processor 120 may calculate an initial value of a voice parameter used to perform beamforming on the external sound signal. The processor 120 may calculate an initial value of a voice covariance matrix Cx described above with reference to FIGS. 4 and 5A based on signals input to the plurality of microphones. For example, the processor 120 may obtain an initial value of a voice covariance matrix between an audio signal input to each of a plurality of external microphones. As another example, the processor 120 may obtain an initial value of a voice covariance matrix between an audio signal input to an external microphone (e.g., the external microphone (e.g., first microphone 150-1) of FIG. 3) and an audio signal input to an internal microphone (e.g., the in-ear microphone 150-2 of FIG. 3).

According to one embodiment, in operation 630, the processor 120 may determine whether to store the calculated initial value of the voice parameter according to the feature value. In response to the SNR of the external sound signal exceeding a first threshold value (e.g., 15 decibels (dB)), the processor 120 may store the calculated initial value of the voice covariance matrix in the voice parameter initial value information 580 of the memory 130. In response to the SNR of the external sound signal being less than or equal to the first threshold value (e.g., 15 dB), the processor 120 may determine not to store the calculated initial value of the voice covariance matrix in the voice parameter initial value information 580 of the memory 130.

In response to the SNR exceeding, for example, 15 dB, which is a high SNR, a voice covariance matrix may be estimated with high accuracy using the initial value of the voice covariance matrix, and beamforming performance may be maintained. An operation of the processor 120 to be performed when the feature value of the external sound signal exceeds the first threshold value is described in detail with reference to FIG. 9.

According to one embodiment, in operation 640, the processor 120 may determine which one of the calculated initial value or a stored initial value is to be used to obtain a voice parameter according to the feature value. In response to the SNR of the external sound signal exceeding a second threshold value (e.g., 5 dB), the processor 120 may use the initial value of the voice parameter calculated in operation 620, and in response to the SNR of the external sound signal being less than or equal to the second threshold value, the processor 120 may determine to load and use the initial value stored in the voice parameter initial value information 580 of the memory 130.

In response to the SNR exceeding, for example, 5 dB, the processor 120 may obtain a target voice parameter by performing an update based on the calculated initial value. In response to the SNR being less than or equal to, for example, 5 dB, when a good initial value is provided, a voice covariance matrix may be estimated (or updated) with high accuracy, and the beamforming performance may be maintained. In response to the SNR being less than or equal to 5 dB, the processor 120 may determine a target voice covariance matrix used to determine a beamformer filter by loading the initial value (e.g., the initial value stored in operation 630) of the voice covariance matrix stored when the SNR exceeds 15 dB and updating the voice covariance matrix accordingly. An operation of the processor 120 to be performed when the feature value of the external sound signal is less than or equal to the first threshold value and exceeds the second threshold value is described in detail with reference to FIG. 10. An operation of the processor 120 to be performed when the feature value of the external sound signal is less than or equal to the second threshold value and exceeds a third threshold value is described in detail with reference to FIG. 11.

According to one embodiment, in operation 650, the processor 120 may obtain the target voice parameter used to perform beamforming based on the determined initial value according to the feature value. In response to the SNR of the external sound signal exceeding the third threshold value (e.g., −5 dB), the processor 120 may determine the target voice covariance matrix for determining the beamformer filter by updating the voice covariance matrix based on the initial value loaded or calculated as described above with reference to operation 640.

In response to the SNR of the external sound signal being less than or equal to the third threshold value (e.g., −5 dB), the processor 120 may determine to use the initial value stored in the voice parameter initial value information 580 of the memory 130 as a voice parameter without an update process. In response to the SNR being less than or equal to −5 dB, for example, the voice covariance matrix may not be estimated because a noise element is dominant over a voice element. Accordingly, in response to the SNR being less than or equal to −5 dB, the processor 120 may load a good initial value stored in the voice parameter initial value information 580 of the memory 130 and use the initial value as the target voice covariance matrix for determining the beamformer filter as it is without an update process. An operation of the processor 120 to be performed when the feature value of the external sound signal is less than or equal to the third threshold value is described in detail with reference to FIG. 8.

The target voice covariance matrix used to determine a customized beamformer filter may be determined through operations 610 to 650 of the processor 120. Beamforming performance degradation caused by a difference in a wearing style or a structure of the inner ear may not occur even in a low SNR environment.

In operations 610 to 650 described above, the first threshold value may be greater than the second threshold value, and the second threshold value may be greater than the third threshold value. The first threshold value may be 15 dB, the second threshold value may be 5 dB, and the third threshold value may be −5 dB, but these are merely examples and not limited thereto.

Figure 7:
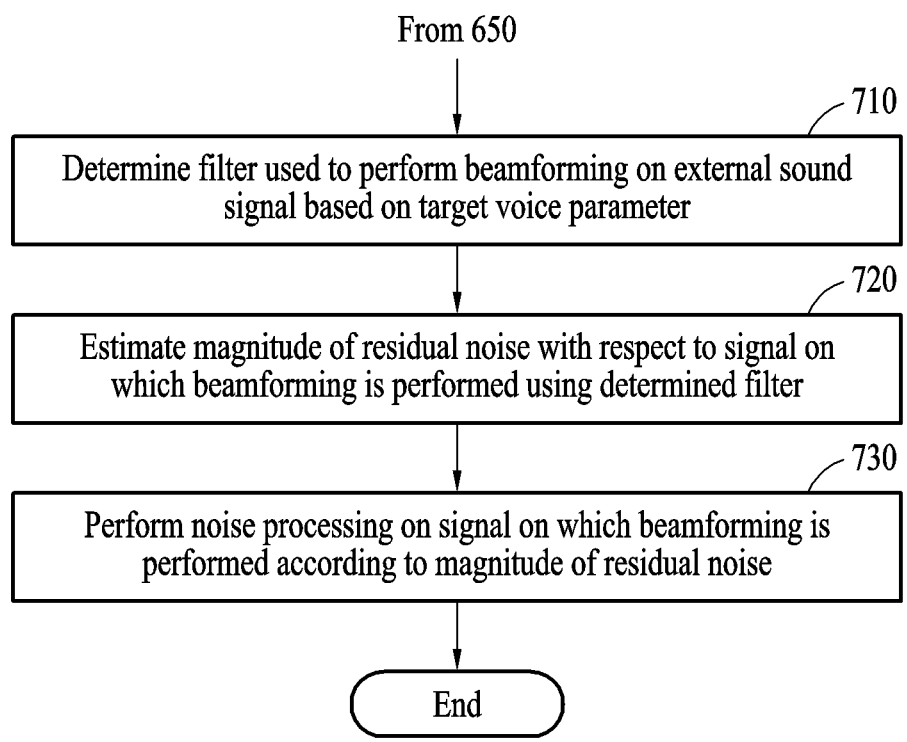
FIG. 7 is a flowchart illustrating a noise processing method of an electronic device according to an embodiment of the disclosure.

FIG. 7 is a flowchart illustrating a noise processing method of an electronic device according to an embodiment of the disclosure.

Operations 710 to 730 may be performed by the processor 120 of the electronic device 101 described above with reference to FIG. 5B. Thus, any description overlapping the description referring to FIGS. 1 to 4, 5A and 5B, and 6 will not be repeated for conciseness. Operations 710 to 730 may correspond to an operation 540 of estimating noise and a noise suppression operation 550 of removing noise after beamforming has been performed described above with reference to FIG. 5A.

According to one embodiment, the processor 120 of the electronic device 101 may perform operations 710 to 730 after an operation (e.g., operation 650 of FIG. 6) of obtaining a target voice parameter based on a feature value of an external sound signal has been performed.

Referring to FIG. 7, according to one embodiment, in operation 710, the processor 120 may determine a beamformer filter used to perform beamforming on the external sound signal based on the target voice parameter obtained through operations 610 to 650 of FIG. 6. For example, the processor 120 may obtain a target voice covariance matrix Cx with high accuracy by performing operations described above with reference to FIG. 6, and the processor 120 may adjust the beamformer filter through the target covariance matrix Cx as described above with reference to FIGS. 4 and 5A. For example, as described above with reference to FIG. 4, the processor 120 may determine a beamformer filter that steers toward the user's mouth and a beamformer filter that generates a null vector toward the user's mouth based on the obtained Cx.

According to one embodiment, the processor 120 may estimate a magnitude of residual noise with respect to a signal on which beamforming is performed using the determined filter in operation 720, and the processor 120 may perform noise processing (e.g., noise suppression) on the signal on which beamforming is performed according to the magnitude of the residual noise in operation 730.

The electronic device 101 may obtain a voice signal of improved quality by determining the beamformer filter and performing noise processing through operations 710 to 730 based on the target voice covariance matrix, which is the target voice parameter.

According to one embodiment, the electronic device 101 may perform a separate training mode to obtain a good initial value of a voice parameter. The processor 120 may output a guide interface that asks a user to perform an utterance to calculate an initial value of a voice parameter to be stored in the voice parameter initial value information 580 of the memory 130 in an environment in which a feature value (e.g., an SNR) exceeds a first threshold value (e.g., 15 dB). For example, a user interface (UI) that asks the user to perform an utterance in an environment with a high feature value, such as a quiet environment, through a display of the electronic device 101 or the electronic device 102 (e.g., the electronic device 102 of FIG. 3) interoperating with the electronic device 101. For example, a UI that asks the user to utter a predetermined or random sentence in a quiet environment may be audibly output to the user through the electronic device 101. As another example, a similar UI may be visually output to the user through the electronic device 102 interoperating with the electronic device 101.

Referring to FIG. 6, the processor 120 may calculate the initial value of the voice parameter based on a user utterance received by a plurality of microphones and store the calculated initial value of the voice parameter in the memory 130. The processor 120 may calculate an initial value of a voice covariance matrix according to the user utterance received by the plurality of microphones. In response to the external sound signal exceeding the first threshold value, the processor 120 may store the calculated initial value in the voice parameter initial value information 580 of the memory 130 as in an operation (e.g., operation 630 of FIG. 6) of the processor 120. In the embodiment of a training mode described above, the processor 120 may obtain and store a good initial value more reliably than in an embodiment of storing an initial value when a feature value is high in a general situation as in operation 630 of FIG. 6.

According to one embodiment, the processor 120 of the electronic device 101 may control beamforming more specifically based on speech power and a direction of arrival (DoA) of the external sound signal. For example, the voice parameter initial value information 580 of the memory 130 described above with reference to FIG. 5B may further include index information according to information on the speech power and DoA. The processor 120 may determine the speech power and DoA of the external sound signal input to the plurality of microphones and further consider the information on the speech power and DoA.

For example, when the processor 120 stores information on the calculated initial value of the voice parameter in the memory 130 (e.g., when the feature value exceeds the first threshold value in operation 630 of FIG. 6), the processor 120 may store the information on the calculated initial value in the voice parameter initial value information 580 of the memory 130 by classifying the information on the calculated initial value according to the information on the speech power and DoA. As another example, when the processor 120 loads information on the initial value of the voice parameter stored in the memory 130 instead of the information on the calculated initial value of the voice parameter (e.g., when the feature value is less than or equal to the second threshold value in operation 640 of FIG. 6), the processor 120 may load the information on the stored initial value from the voice parameter initial value information 580 of the memory 130 by classifying the information on the stored initial value according to the information on the speech power and DoA.

FIGS. 8, 9, 10, and 11 are flowcharts illustrating an operating method of an electronic device according to a feature value of an external sound signal according to various embodiments of the disclosure.

Operations of FIGS. 8 to 11 (e.g., operations 810 to 850 and operations 910 and 920, operation 1010, and operation 1110) may be performed by the processor 120 of the electronic device 101 described above with reference to FIG. 5B. Thus, any description overlapping the description provided with reference to FIG. 7 will not be repeated for conciseness. Operations of FIGS. 8 to 11 may be operations (e.g., operations 610 to 650) of the processor 120 described above with reference to FIG. 6 identified according to a feature value of an external sound signal received by a plurality of microphones.

Referring to FIG. 6, a feature value in FIGS. 8 to 11 may be an SNR or noise power, and a voice parameter may be the voice covariance matrix Cx used to determine the beamformer filter in the signal-dependent beamformer described above with reference to FIG. 4. A first threshold value in FIGS. 8 to 11 may be greater than a second threshold value, and the second threshold may be greater than a third threshold value. The first threshold value may be 15 dB, the second threshold value may be 5 dB, and the third threshold value may be −5 dB, but these are merely examples and examples are not limited thereto.

Figure 8:
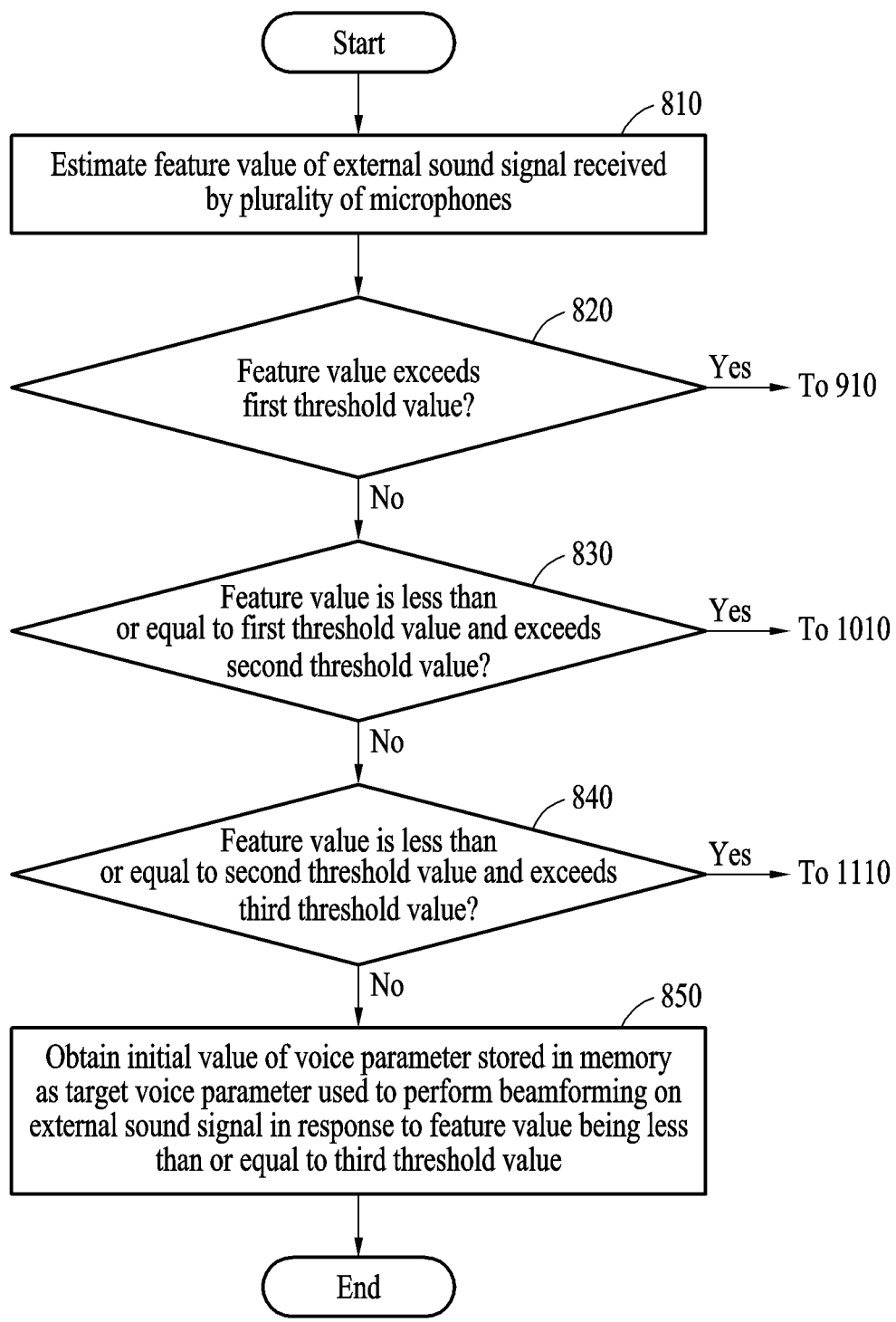
FIGS. 8, 9, 10, and 11 are flowcharts illustrating an operating method of an electronic device according to a feature value of an external sound signal according to various embodiments of the disclosure.

FIG. 8 is a flowchart illustrating an operation of a processor in response to a feature value of an external sound signal being less than or equal to the third threshold value among the operations of a processor described above with reference to FIG. 6 according to an embodiment of the disclosure.

Referring to FIG. 8, according to one embodiment, in operation 810, a processor 120 may estimate a feature value of an external sound signal received by a plurality of microphones. Descriptions of operation 610 provided with reference to FIG. 6 are applicable to operation 810, and thus any repeated description thereof has been omitted.

According to one embodiment, in operations 820 to 840, the processor 120 may identify the feature value based on the first threshold value, the second threshold value, and the third threshold value.

According to one embodiment, in operation 850, in response to the feature value of the external sound signal being less than or equal to the third threshold value, the processor 120 may obtain an initial value of a voice parameter stored in the memory 130 as a voice parameter used to perform beamforming on the external sound signal.

As described above with reference to operation 630 of FIG. 6, in operation 850, in response to an SNR of the external sound signal being less than or equal to the third threshold value (e.g., −5 dB), which is less than or equal to the first threshold value (e.g., 15 dB), the processor 120 may determine not to store an initial value (e.g., the initial value calculated in operation 620 of FIG. 6) calculated based on the external sound signal received by the plurality of microphones in the voice parameter initial value information 580 of the memory 130.

As described with reference to operation 640 of FIG. 6, in response to the SNR of the external sound signal being less than or equal to the third threshold value (e.g., −5 dB), which is less than or equal to the second threshold value (e.g., 5 dB), the processor 120 may determine to use the initial value stored in the voice parameter initial value information 580 of the memory 130 rather than the initial value (e.g., the initial value calculated in operation 620 of FIG. 6) calculated based on the external sound signal received by the plurality of microphones.

As described with reference to operation 650 of FIG. 6, in response to the SNR of the external sound signal being less than or equal to the third threshold value (e.g., −5 dB), the processor 120 may not update the initial value stored in the voice parameter initial value information 580 of the memory 130 and determine that the initial value is a target voice parameter used to determine a beamformer filter. The processor 120 may determine a beamformer filter based on the target voice covariance matrix obtained in operation 850 and perform noise processing.

Figure 9:
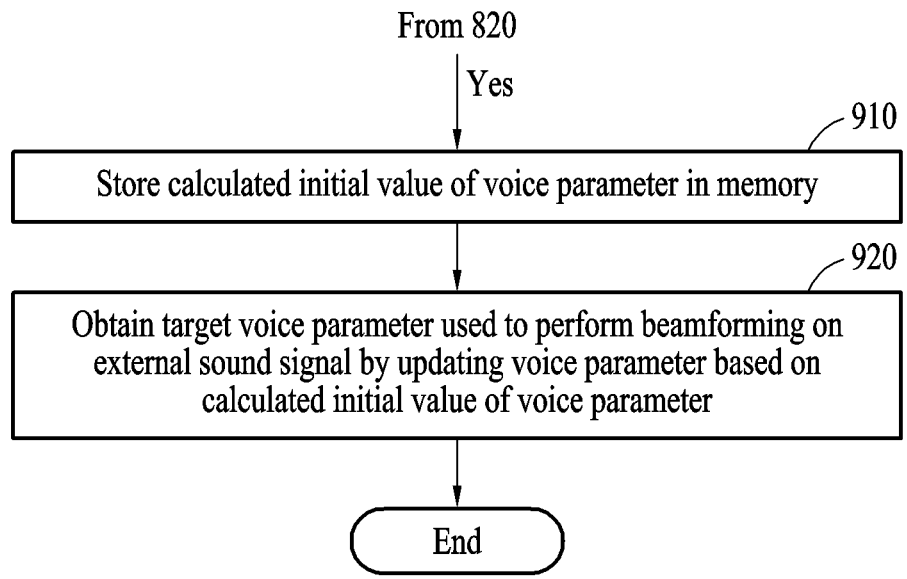

FIG. 9 is a flowchart illustrating an operation of a processor when a feature value of an external sound signal exceeds a first threshold value among the operations of a processor described with reference to FIG. 6 according to an embodiment of the disclosure.

Referring to FIG. 9, according to an embodiment, a processor 120 may estimate (e.g., operation 810 of FIG. 8) a feature value of an external sound signal received by a plurality of microphones and perform operations 910 and 920 in response to the feature value exceeding the first threshold value (e.g., if "Yes" in operation 820 of FIG. 8).

According to one embodiment, in operation 910, in response to the feature value of the external sound signal exceeding the first threshold value, the processor 120 may store a calculated initial value of a voice parameter in the memory 130. As described above with reference to operation 630 of FIG. 6, in operation 910, in response to an SNR of the external sound signal exceeding the first threshold value (e.g., 15 dB), the processor 120 may store an initial value (e.g., the initial value calculated in operation 620 of FIG. 6) calculated based on the external sound signal received by the plurality of microphones in the voice parameter initial value information 580 of the memory 130.

According to one embodiment, in operation 920, in response to the feature value of the external sound signal exceeding the first threshold value, the processor 120 may obtain a target voice parameter used to perform beamforming on the external sound signal by updating the voice parameter based on the calculated initial value of the voice parameter.

As described above with reference to operation 640 of FIG. 6, in operation 920, in response to the SNR of the external sound signal exceeding the first threshold value (e.g., 15 dB) and accordingly exceeding a second threshold value (e.g., 5 dB), the processor 120 may determine to use the calculated initial value (e.g., the initial value calculated in operation 620 of FIG. 6) rather than the stored initial value.

As described above with reference to operation 650 of FIG. 6, in response to the SNR of the external sound signal exceeding the first threshold value (e.g., 15 dB) and accordingly exceeding a third threshold value (e.g., −5 dB), the processor 120 may obtain a target voice parameter used to determine a beamformer filter by updating the calculated initial value. For example, the processor 120 may determine a target voice covariance matrix used to determine a beamformer filter by updating a calculated initial value of a voice covariance matrix Cx. The processor 120 may determine a beamformer filter based on the target voice covariance matrix obtained in operation 920 and perform noise processing.

Figure 10:
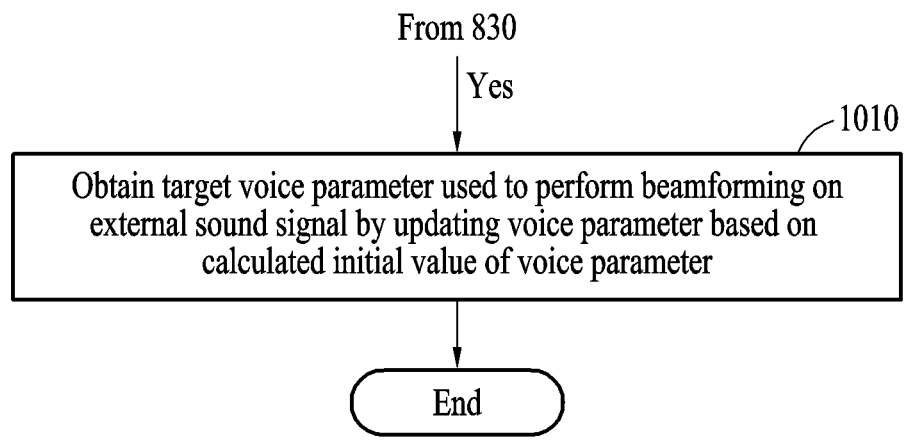

FIG. 10 is a flowchart illustrating an operation of a processor in response to a feature value of an external sound signal being less than or equal to a first threshold value and exceeding a second threshold value among the operations of a processor described with reference to FIG. 6 according to an embodiment of the disclosure.

Referring to FIG. 10, according to an embodiment, the processor 120 may estimate (e.g., operation 810 of FIG. 8) a feature value of an external sound signal received by a plurality of microphones and perform operation 1010 in response to the feature value being less than or equal to the first threshold value and exceeding the second threshold value (e.g., if "Yes" in operation 830 of FIG. 8).

According to one embodiment, in operation 1010, in response to the feature value of the external sound signal being less than or equal to the first threshold value and exceeding the second threshold value, the processor 120 may obtain a target voice parameter by updating a voice parameter based on a calculated initial value of the voice parameter.

As described above with reference to operation 630 of FIG. 6, in operation 1010, in response to an SNR of the external sound signal being less than or equal to the first threshold value (e.g., 15 dB), the processor 120 may determine not to store the calculated initial value (e.g., the initial value calculated in operation 620 of FIG. 6) in the voice parameter initial value information 580 of memory 130.

As described above with reference to operation 640 of FIG. 6, in operation 1010, the processor 120 may determine to use the calculated initial value (e.g., the initial value calculated in operation 620 of FIG. 6) rather than a stored initial value because the SNR of the external sound signal exceeds the second threshold value (e.g., 5 dB).

As described above with reference to operation 650 of FIG. 6, in response to the SNR of the external sound signal exceeding the second threshold value (e.g., 5 dB) and accordingly exceeding a third threshold value (e.g., −5 dB), the processor 120 may obtain the target voice parameter used to determine a beamformer filter by updating the calculated initial value. For example, the processor 120 may determine a target voice covariance matrix used to determine a beamformer filter by updating a calculated initial value of a voice covariance matrix Cx. The processor 120 may determine a beamformer filter based on the target voice covariance matrix obtained in operation 1010 and perform noise processing.

Figure 11:
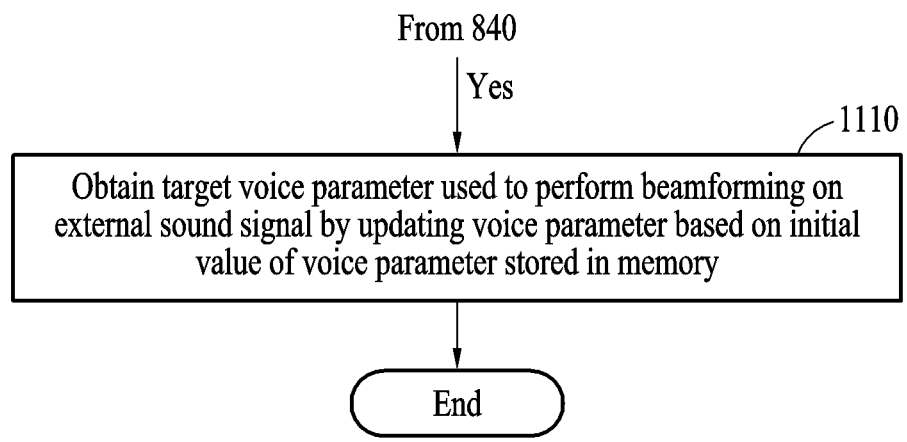

FIG. 11 is a flowchart illustrating an operation of a processor when a feature value of an external sound signal is less than or equal to a second threshold value and exceeds a third threshold value among the operations of a processor described with reference to FIG. 6 according to an embodiment of the disclosure.

Referring to FIG. 11, according to an embodiment, a processor 120 may estimate (e.g., operation 810 of FIG. 8) a feature value of an external sound signal received by a plurality of microphones and perform operation 1110 in response to the feature value being less than or equal to the second threshold value and exceeding the third threshold value (e.g., if "Yes" in operation 840 of FIG. 8).

According to one embodiment, in operation 1110, in response to the feature value of the external sound signal being less than or equal to the second threshold value and exceeding the third threshold value, the processor 120 may obtain a target voice parameter by updating a voice parameter based on an initial value of the voice parameter loaded from a memory.

As described above with reference to operation 630 of FIG. 6, in operation 1110, in response to an SNR of the external sound signal being less than or equal to the second threshold value (e.g., 5 dB) and accordingly being less than or equal to the first threshold value (e.g., 15 dB), the processor 120 may determine not to store a calculated initial value (e.g., the initial value calculated in operation 620 of FIG. 6) in the voice parameter initial value information 580 of the memory 130.

As described above with reference to operation 640 of FIG. 6, in operation 1110, in response to the SNR of the external sound signal being less than or equal to the second threshold value (e.g., 5 dB), the processor 120 may determine to use a stored initial value and load an initial value from the voice parameter initial value information 580.

As described above with reference to operation 650 of FIG. 6, in response to the SNR of the external sound signal exceeding the third threshold value (e.g., −5 dB), the processor 120 may obtain a target voice parameter used to determine a beamformer filter by updating an initial value. For example, the processor 120 may obtain a target voice covariance matrix used to determine the beamformer filter by updating an initial value of a voice covariance matrix Cx loaded from the voice parameter initial value information 580 of the memory 130. The processor 120 may determine the beamformer filter based on the target voice covariance matrix obtained in operation 1110 and perform noise processing.

According to one embodiment, an electronic device 101 may include an input module 150 including a plurality of microphones 150-1 and 150-2 configured to receive an external sound signal, a memory 130 configured to store computer-executable instructions and an initial value information 580 of a voice parameter Cx used to perform beamforming on the external sound signal, and a processor 120 configured to execute the instructions by accessing the memory 130, wherein the instructions may be configured to estimate a feature value (an SNR or noise power) of the external sound signal, calculate an initial value of a voice parameter used to perform beamforming based on the external sound signal received by the plurality of microphones, determine whether to store the calculated initial value in the memory 130 according to the feature value, determine which one of the calculated initial value or the initial value stored in the memory 130 is to be used according to the feature value, and obtain a target voice parameter used to perform beamforming on the external sound signal based on the determined initial value according to the feature value.

According to one embodiment, the instructions may be further configured to determine a filter used to perform beamforming on the external sound signal based on the target voice parameter.

According to one embodiment, the electronic device 101 may further include an audio module 170 configured to perform noise processing on an audio signal, and the instructions may be further configured to estimate a magnitude of residual noise with respect to a signal on which beamforming is performed using the filter and perform noise processing on the signal on which beamforming is performed according to the estimated magnitude of the residual noise.

According to one embodiment, the instructions may be further configured to, in response to the feature value exceeding a first threshold value (e.g., 15 dB), store the calculated initial value of the voice parameter in the memory 130 and obtain the target voice parameter by updating a voice parameter based on the calculated initial value of the voice parameter.

According to one embodiment, the instructions may be further configured to, in response to the feature value being less than or equal to the first threshold value (e.g., 15 dB) and exceeding a second threshold value (e.g., 5 dB), obtain the target voice parameter by updating a voice parameter based on the calculated initial value of the voice parameter.

According to one embodiment, the instructions may be further configured to, in response to the feature value being less than or equal to a second threshold value (e.g., 5 dB) and exceeding a third threshold value (e.g., −5 dB), obtain the target voice parameter by updating a voice parameter based on the initial value stored in the memory 130.

According to one embodiment, the instructions may be further configured to, in response to the feature value being less than or equal to a third threshold value (e.g., −5 dB), obtain the initial value of the voice parameter stored in the memory 130 as the target voice parameter.

According to one embodiment, instructions may be further configured to output a guide interface configured to ask a user to perform an utterance to calculate an initial value of a voice parameter to be stored in the memory 130, calculate the initial value of the voice parameter based on a user utterance received by the plurality of microphones, and store the calculated initial value of the voice parameter in the memory 130.

According to one embodiment, the initial value information 580 of the voice parameter stored in the memory 130 may be classified according to a magnitude of a sound signal, and the instructions may be further configured to calculate a magnitude of the external sound signal, load the initial value stored in the memory 130 according to the magnitude of the external sound signal in response to the feature value being less than or equal to a second threshold value (e.g., 5 dB), and obtain the target voice parameter based on the loaded initial value.

According to one embodiment, the initial value of the voice parameter stored in the memory 130 may be classified according to a direction of a sound signal, and the instructions may be further configured to determine a direction of the external sound signal, load the initial value stored in the memory 130 according to the direction of the external sound signal in response to the feature value being less than or equal to a second threshold value (e.g., 5 dB), and obtain the target voice parameter based on the loaded initial value.

According to one embodiment, the feature value may be one of an SNR value or noise power, and the voice parameter may be a voice covariance matrix.

According to one embodiment, the plurality of microphones may include an external microphone (e.g., first microphone 150-1) placed on one side of the electronic device 101, and the electronic device 101 may further include an in-ear microphone 150-2 and an accelerator 502.

According to one embodiment, the electronic device 101 may be one of a true-wireless stereo (TWS) earphone, headphones, or a headset.

According to one embodiment, a method in which the electronic device 101 obtains a voice parameter used to perform beamforming may include estimating a feature value of an external sound signal received by a plurality of microphones, calculating an initial value of a voice parameter used to perform beamforming on the external sound signal, determining whether to store the calculated initial value according to the feature value, determining which one of the calculated initial value or the stored initial value is to be used according to the feature value, and obtaining a target voice parameter used to perform beamforming on the external sound signal based on the determined initial value according to the feature value.

According to one embodiment, the determining of whether to store the calculated initial value according to the feature value may include storing the calculated initial value of the voice parameter in response to the feature value exceeding a first threshold value (e.g., 15 dB), and not storing the calculated initial value of the voice parameter in response to the feature value being less than or equal to the first threshold value (e.g., 15 dB).

According to one embodiment, the determining of which one of the calculated initial value or the stored initial value is to be used according to the feature value may include using the calculated initial value in response to the feature value exceeding a second threshold value (e.g., 5 dB), and using the stored initial value in response to the feature value being less than or equal to the second threshold value (e.g., 5 dB).

According to one embodiment, the obtaining of a target voice parameter used to perform beamforming on the external sound signal based on the determined initial value according to the feature value may include obtaining the target voice parameter by updating a voice parameter based on the determined initial value in response to the feature value exceeding a third threshold value (e.g., −5 dB), and obtaining the determined initial value as the target voice parameter in response to the feature value being less than or equal to the third threshold value (e.g., −5 dB).

According to one embodiment, an operating method of the electronic device 101 may include estimating a feature value of an external sound signal received by the plurality of microphones 150-1 and 150-2, calculating an initial value of a voice parameter used to perform beamforming on the external sound signal, determining whether to store the calculated initial value according to the feature value, determining which one of the calculated initial value or the stored initial value is to be used according to the feature value, obtaining a target voice parameter used to perform beamforming on the external sound signal based on the determined initial value according to the feature value, determining a filter used to perform beamforming on the external sound signal based on the target voice parameter, estimating a magnitude of residual noise with respect to a signal on which beamforming is performed using the filter, and performing noise processing on the signal on which beamforming is performed according to the estimated magnitude of the residual noise.

According to one embodiment, the electronic device 101 may be one of a true-wireless stereo (TWS) earphone, headphones, or a headset.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a plurality of microphones;
memory storing computer-executable instructions; and
at least one processor including processing circuitry,
wherein the instructions, when executed by the at least one processor, cause the electronic device to:
estimate a feature value of an external sound signal received by the plurality of microphones,
calculate an initial value of a voice parameter used to perform beamforming based on the external sound signal,
in response to the feature value being less than or equal to a first threshold value and exceeding a second threshold value, obtain a first target of the voice parameter based on the calculated initial value,
in response to the feature value being less than or equal to the second threshold value and exceeding a third threshold value, load an initial value of the voice parameter from the memory and obtain a second target of the voice parameter by updating the loaded initial value, and
in response to the feature value being less than or equal to the third threshold value, determine the loaded initial value as a third target of the voice parameter.

2. The electronic device of claim 1, wherein, when executed by the at least one processor, cause the electronic device to:
determine a filter to be used to perform beamforming on the external sound signal based on the first target, the second target, or the third target.

3. The electronic device of claim 2, wherein the instructions, when executed by the at least one processor, cause the electronic device to:
estimate a magnitude of residual noise with respect to a signal on which beamforming is performed using the filter, and
perform noise processing on the signal on which beamforming is performed according to the estimated magnitude of the residual noise.

4. The electronic device of claim 1, wherein the instructions, when executed by the at least one processor, cause the electronic device to:
in response to the feature value exceeding the first threshold value, store the calculated initial value of the voice parameter in the memory; and
obtain a fourth target of the voice parameter by updating the calculated initial value.

5. The electronic device of claim 1, wherein the instructions, when executed by the at least one processor, cause the electronic device to:
output a guide interface configured to ask a user to perform an utterance to calculate an initial value of the voice parameter to be stored in the memory;
calculate the initial value of the voice parameter based on the user utterance received by the plurality of microphones; and
store the calculated initial value of the voice parameter in the memory.

6. The electronic device of claim 1,
wherein an initial value of the voice parameter stored in the memory is classified according to a magnitude of a sound signal, and
wherein the instructions, when executed by the at least one processor, cause the electronic device to:
calculate a magnitude of the external sound signal, and
load the initial value from the memory according to the magnitude of the external sound signal in response to the feature value being less than or equal to the second threshold value.

7. The electronic device of claim 1,
wherein an initial value of the voice parameter stored in the memory is classified according to a direction of a sound signal, and
wherein the instructions, when executed by the at least one processor, cause the electronic device to:
determine a direction of the external sound signal, load the initial value from the memory according to the direction of the external sound signal in response to the feature value being less than or equal to the second threshold value.

8. The electronic device of claim 1,
wherein the feature value is one of a signal-to-noise ratio (SNR) value or noise power, and
wherein the voice parameter is a voice covariance matrix.

9. The electronic device of claim 1,
wherein the plurality of microphones comprises an external microphone placed on one side of the electronic device, and
wherein the electronic device further comprises an in-ear microphone and an accelerator.

10. The electronic device of claim 1, wherein the electronic device is one of a true-wireless stereo (TWS) earphone, headphones, or a headset.

11. A method performed by an electronic device of obtaining a voice parameter used to perform beamforming, the method comprising:
estimating a feature value of an external sound signal received by a plurality of microphones;
calculating an initial value of a voice parameter used to perform beamforming on the external sound signal;
in response to the feature value being less than or equal to a first threshold value and exceeding a second threshold value, obtaining a first target of the voice parameter based on the calculated initial value,
in response to the feature value being less than or equal to the second threshold value and exceeding a third threshold value, loading an initial value of the voice parameter from a memory of the electronic device and obtaining a second target of the voice parameter by updating the loaded initial value, and
in response to the feature value being less than or equal to the third threshold value, determining the loaded initial value as a third target of the voice parameter.

12. The method of claim 11, further comprising:
storing the calculated initial value of the voice parameter in response to the feature value exceeding the first threshold value; and
obtaining a fourth target of the voice parameter by updating the calculated initial value.

13. A non-transitory computer-readable storage medium storing instructions that, when executed by at least one processor of an electronic device, cause the electronic device to perform operations, the operations comprising:
estimating a feature value of an external sound signal received by a plurality of microphones;
calculating an initial value of a voice parameter used to perform beamforming on the external sound signal;
in response to the feature value being less than or equal to a first threshold value and exceeding a second threshold value, obtaining a first target of the voice parameter based on the calculated initial value;
in response to the feature value being less than or equal to the second threshold value and exceeding a third threshold value, loading an initial value of the voice parameter from a memory of the electronic device and obtain a second target of the voice parameter by updating the loaded initial value; and
in response to the feature value being less than or equal to the third threshold value, determine the loaded initial value as a third target of the voice parameter.

14. An operating method performed by an electronic device, the operating method comprising:
estimating a feature value of an external sound signal received by a plurality of microphones;
calculating an initial value of a voice parameter used to perform beamforming on the external sound signal;
obtaining a target voice parameter used to perform beamforming on the external sound signal;
determining a filter to be used to perform beamforming on the external sound signal based on the target voice parameter;
estimating a magnitude of residual noise with respect to a signal on which beamforming is performed using the filter; and
performing noise processing on the signal on which beamforming is performed according to the estimated magnitude of the residual noise,
wherein the obtaining of the target voice parameter includes
in response to the feature value being less than or equal to a first threshold value and exceeding a second threshold value, obtaining a first target of the voice parameter based on the calculated initial value;
in response to the feature value being less than or equal to the second threshold value and exceeding a third threshold value, loading an initial value of the voice parameter from a memory of the electronic device and obtaining a second target of the voice parameter by updating the loaded initial value; and
in response to the feature value being less than or equal to the third threshold value, determining the loaded initial value as a third target of the voice parameter.

15. The operating method of claim 14, wherein the electronic device is one of a true-wireless stereo (TWS) earphone, headphones, or a headset.

16. The operating method of claim 14, wherein the plurality of microphones comprises a first microphone having a sound hole positioned on a mounting portion of an earphone, the sound hole adjacent to an inner portion of a user ear, the sound hole being exposed to an outside of the user ear.

17. The operating method of claim 16, wherein the plurality of microphones further comprises a second microphone disposed on an insertion portion of the earphone, a sound hole of the second microphone disposed so that at least a portion of the sound hole of the second microphone is exposed towards an inner wall of the outside of the user ear.

18. The operating method of claim 14, further comprising:
performing voice activity detection (VAD) using an accelerator and a voice pickup unit (VPU) sensor of the electronic device.

* * * * *